3,036,010
NON-GASSING INSULATING OILS

Benno Freier, La Mailleraye-sur-Seine, and André Marter, Le Trait, France, assignors to Esso Standard Societe Anonyme Francaise, Paris, France, a corporation of France
No Drawing. Filed June 12, 1959, Ser. No. 819,809
Claims priority, application France July 1, 1958
1 Claim. (Cl. 252—63)

The present invention concerns insulating oils having improved stability. Such insulating oils are used, for example, in transformers, condensers and filled or hollow cables.

The stability of insulating oils depends partly on the chemical constitution and molecular weight of the oil, and partly on the stresses to which it is subjected. Thus the instability of the oils is accentuated when the strength of the electric field, the frequency of the electric current, and/or the temperature are increased.

Insulating oils commonly employed for transformers, for instance, are subjected to considerable dielectric stresses. Under such conditions the oils tend to liberate gas, the accumulation of which may cause deformation in the cables and the risk of explosion in the transformers; the resistance of the oils to oxidation is also lessened.

It has now been found that insulating oils comprising mineral oil and at least one alkylbenzene possess improved stability against liberation of gas and good resistance to oxidation.

The alkylbenzenes may be prepared by reacting an olefin, preferably a straight or branched chain aliphatic olefin having 8 to 30 carbon atoms, with benzene in the presence of a catalyst such as $AlCl_3$, $AlBr_3$, $BF_3$ and HF. A particularly preferred product is obtained by reacting benzene with the tetramer of propylene, the product preferably having a boiling point between 290 and 395° C.

A suitable product may have, for example, the following characteristics.

Density at 15° C _____ 0.881
Engler viscosity at 50° C _____ 3
Aniline point _____ ° C__ 58
ASTM distillation:
    Initial point _____ ° C__ 290
    10% _____ ° C__ 330
    50% _____ ° C__ 363
    90% _____ ° C__ 384
    Final point _____ ° C__ 395

The mineral oil to which the alkylbenzenes are added may have the following characteristics.

|  | Minimum | Maximum |
|---|---|---|
| Density at 15° C | 0.880 | 0.900 |
| Flash Point in ° C | 155 |  |
| Viscosity in centistokes at 0° C | 80 | 120 |
|   at 20° C | 24 | 36 |
|   at 50° C | 7.2 | 10 |
| Acid Number |  | 0.02 |
| Iodine number (Wijs) | 13 | 20 |
| Aniline point | 77 |  |

The insulating oils of the present invention may also contain other additives such as antioxidants.

The following example will better show the scope and importance of the invention. The product A used in the example was a narrow-cut fraction (boiling from 320 to 395° C.), cut from the wider boiling fraction (270 to 395° C.) obtained by alkylating benzene with propylene tetramer. The oil A referred to below was a technical white oil obtained by treating mineral oil with oleum; oil B was an insulating oil obtained by treatment of mineral oil with sulphuric acid, and which was specially designed for hollow cables with oil circulation and for condensers.

Example

Hydrogen adsorption tests have been carried out by the Pirelli method which consists of measuring the amount of hydrogen adsorbed or given off as a function of the time of the test conducted at 80° C. under the following conditions:

18 cm.$^3$ of oil saturated with hydrogen and surmounted by an atmosphere of hydrogen is subjected in a glass cell to an alternating electric field of 12,000 volts. The liberation of hydrogen is followed by the movement of the oil in a lateral glass tube. After the establishment of the heat balance the field is established between the two electrodes traversing and surrounding the cell and the adsorption or the release of gas is followed as a time function.

| Insulating Oil | Volume of hydrogen in cc. liberated (+) or adsorbed (−) according to the length of test in minutes ||||||||||
|---|---|---|---|---|---|---|---|---|---|---|
|  | 5 | 10 | 30 | 60 | 110 | 120 | 135 | 150 | 180 | 190 |
| Oil A |  | −0.3 |  | −0.32 | +0.1 |  |  | +0.75 |  | +1.1 |
| 50% oil A+50% product A |  | −0.5 |  | −0.9 |  | −1.1 |  |  |  | −1.3 |
| Oil B |  | −0.15 | −0.25 | −0.5 |  |  |  | −0.8 | −0.95 |  |
| 90% oil B+10% product A | −0.45 |  |  | −0.6 | −0.75 |  |  | −0.95 |  |  |

This table shows that:

By adding 50% of the product A to oil A, an insulating composition is obtained which has a high capacity for hydrogen adsorption.

By adding only 10% of product A to oil B, its adsorption capacity is increased and, after 135 minutes, has risen from 0.8 to 0.95 cc. viz. an increase of nearly 20%.

Further tests were conducted according to the Swiss official method (Swiss Electricians' Association) for measuring the stability to oxidation of insulating oils.

It was found that the addition of product A resulted in a diminution in the increase of acid number and deposit formation over an extended period of time.

The following results were obtained.

| Oil | 72 Hours | | | | 168 Hours | | | |
|---|---|---|---|---|---|---|---|---|
| | Colouration. | Acid Number. | Deposits in sol. in petroleum ether. | Cotton.[1] | Colouration. | Acid number. | Deposits in sol. in pet. ether. | Cotton.[1] |
| Oil B | Bright Red. | 0.084 | 0.003 | 0 | Dark Red. | 0.196 | 0.057 | 0. |
| 90% oil B+10% product A | ---do--- | 0.084 | 0.006 | 0 | ---do--- | 0.168 | 0.041 | 0. |

[1] Decrease in mechanical resistance of cotton thread plunged in oil throughout test.

What is claimed is:

An insulating oil comprising a major proportion of mineral oil having a viscosity of from 7.2 to 10 centistokes at 50° C. and about 5 to 10% by weight of an alkyl benzene produced by reacting benzene with propylene tetramer and recovering a material having a boiling point of about 290° to 395° C. and wherein said insulating oil has a greater tendency to adsorb hydrogen gas than said mineral oil when subjected to dielectric stress.

References Cited in the file of this patent

UNITED STATES PATENTS

| | | |
|---|---|---|
| 1,878,509 | Michel | Sept. 20, 1932 |
| 2,073,080 | Peski | Mar. 9, 1937 |
| 2,112,735 | Clark | Mar. 29, 1938 |
| 2,477,382 | Lewis | July 26, 1949 |
| 2,688,643 | Dean et al. | Sept. 7, 1954 |
| 2,810,769 | Sanford et al. | Oct. 22, 1957 |
| 2,810,770 | Sanford et al. | Oct. 22, 1957 |